May 1, 1934.                    W. A. COOMBS                    1,956,944
                ROCKER GEAR FOR Z CRANK AXIAL ENGINES OR THE LIKE
                         Filed Oct. 14, 1933              2 Sheets-Sheet 1

William Augustus Coombs
INVENTOR

By [signature]
his ATTY.

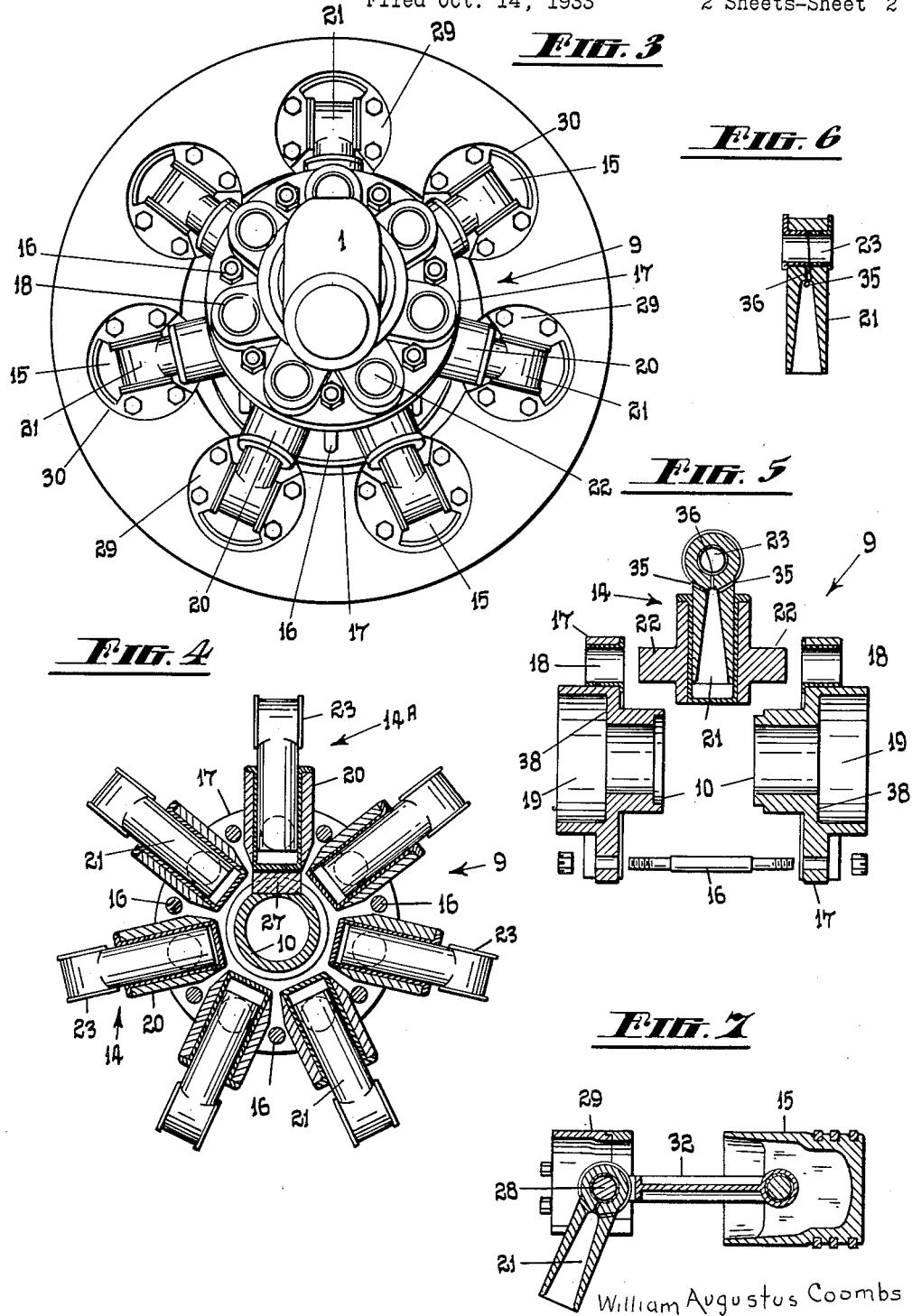

Patented May 1, 1934

1,956,944

UNITED STATES PATENT OFFICE 1,956,944

ROCKER GEAR FOR Z CRANK AXIAL ENGINES OR THE LIKE

William Augustus Coombs, Prospect, South Australia, Australia

Application October 14, 1933, Serial No. 693,570
In Australia October 11, 1932

6 Claims. (Cl. 74—14)

This invention relates to an improved rocker gear for Z crank axial engines, compressors or the like and it has been especially designed to provide a rocker and couplings which will give a high efficiency, will impart no side thrust to the pistons and will be readily adaptable to engines or the like having three or more axial cylinders, further features being the manner of supporting the rocker upon the Z crank, the particular type of coupling used between the rocker and the pistons, and the oiling system.

In order that the invention may be the more clearly understood however I will now describe it with reference to the accompanying drawings wherein:

Fig. 3 is an end elevation principally of the rocker gear but showing also the cylinder block.

Fig. 4 is a central section as on line 4—4 of Fig. 2 but showing only the rocker gear.

Fig. 5 is a central section of the rocker assembly.

Fig. 6 is a central section of one of the hollow stems, and Fig. 7 is a central section of a modified connection between the rocker gear and the piston.

Figure 1:
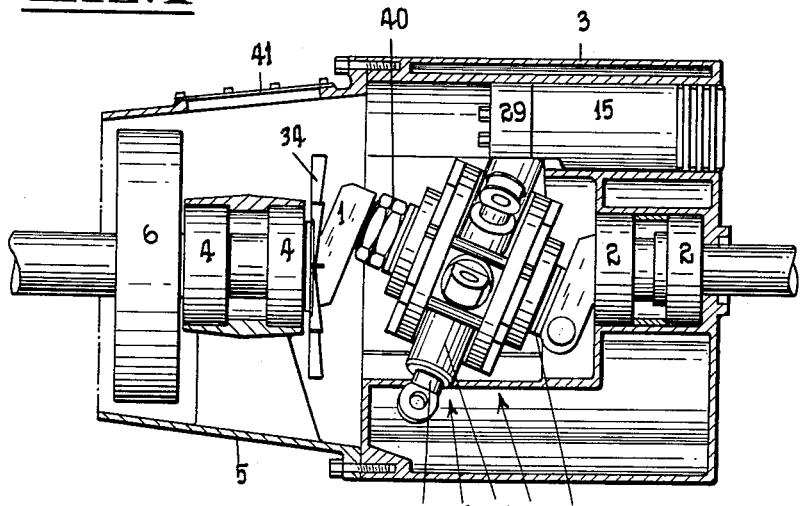
Fig. 1 is a sectional elevation of portion of an engine fitted with the improved rocker gear. This figure is drawn to a smaller scale than the other figures.

The Z crank 1 may be constructed after any usual or approved manner and is in two parts, rigidly connected together, to facilitate the assembly of the rocker upon the crank. It is supported at one end in thrust and journal bearings 2 in the cylinder block 3 and is supported at the other end in thrust and journal bearings 4 in the crank case 5. A flywheel 6 as shown in Fig. 1 may be used to provide any required inertia.

The rocker 9 comprises a cylindrical body 10 within which are the main bearings 11 and 12 and from which radiate the arms 14 to the outer ends of each of which a piston as 15 is coupled.

The rocker body 10 is made in two coaxial sections fitting together and rigidly connected by bolts 16. Each section has an encircling flange 17 through which the bolts 16 pass and in which are bushed perforations 18. Each section also has in it a recess 19 for one of the roller bearings 11 or 12.

Each of the arms 14 comprises a bushed cylindrical sleeve 20 and a hollow stem 21. The sleeve 20 has upon it two coaxial trunnions 22 which project one from each side and are at right angles to its axis. The inner end of the sleeve 20 is closed. The hollow stem 21 passes into the sleeve 20 and is freely slidable and rotatable therein, its end projecting therefrom and having a bushed eye 23. The bushing of this eye is in two sections as shown in Fig. 7.

The arms 14 are supported by the rocker body 10, the trunnions 22 on the sleeves 20 engaging in the perforations 18 in the flanges 17 of the rocker body. The arms 14 are thus free to swing about the axes of their trunnions, which axes are parallel to the axis of the rocker body, but are restrained from movement in the direction of the axis of the rocker body.

One arm 14A however, which I term the master arm, is prevented from moving about its trunnions by an extension 27 of the sleeve 20 engaging the rocker body 10.

Figure 2:
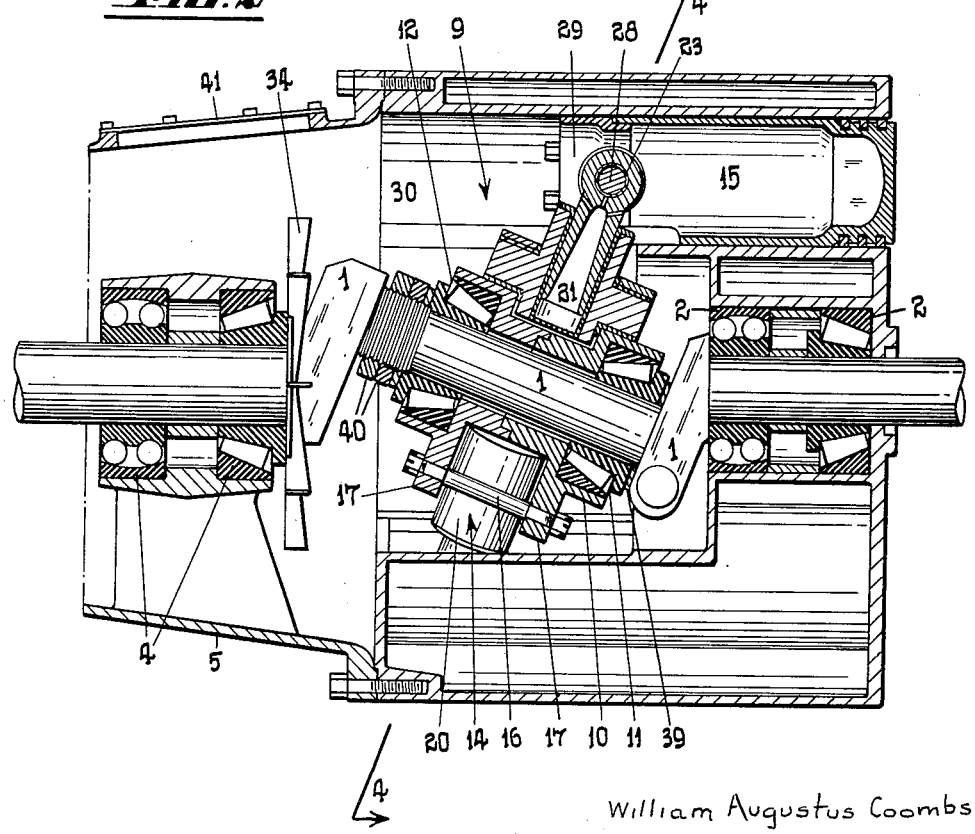
Fig. 2 is a central section of same but omitting the flywheel shown in Fig. 1.

The bushed eye 23 in the end of each hollow stem 21 accommodates a wrist pin 28 which is secured in a split cylindrical slider 29 operating in the outer end of the cylinder 30 containing the piston 15 which is operated by that arm. The slider 29 is secured directly upon the end of the piston 15 as shown in Figs. 1 and 2 of the drawings, but it may be connected to its piston 15 by a short connecting rod 32 as shown in Fig. 7. The slider 29 may operate in a guide separate from the cylinder but coaxial therewith.

As the rocker 9 operates, each hollow stem 21 has a short axial movement relative to its sleeve 20 (due to the sleeve describing an arc as it reciprocates while the wrist pin on the slider 29 moves in a straight line) and this movement is utilized to give an effective oiling of the parts in the following manner. The outer end of the stem 21 has in it jet-like perforations 35 through which oil fed thereto by the splash from the crank case or by splash from vanes as 34 is drawn as the stem moves outward, (the stem acting as a piston in the sleeve). When the stem 21 moves inward some of this oil is ejected through the perforation 35 and plays on to the piston 15 or cylinder wall. Other of this oil passes through a duct 36 in the top of the stem 21 and lubricates the wrist pin 28, and if a short connecting rod 32 as in Fig. 7 is used, its bearings. Other of this oil may pass through a duct into the trunnions and so lubricate them, but this latter duct may be omitted and is not shown in the drawings.

The bearings 11 and 12 which support the rocker 9 upon the Z crank 1 are combined thrust and journal roller bearings, one at each end of the rocker body, and are opposed to each other. They are prevented from moving toward each other by their outer races engaging shoulders 38 in the rocker body, and are prevented from moving away from each other by the inner race of one engaging a shoulder 39 upon the cylinder end of the Z crank 1 and the inner race of the other engaging an adjusting nut 40, suitably locked, upon the thrust end of the Z crank. This type of bearing permits of easy and full adjustment from time to time should any looseness develop, a removable plate 41 in the crank case 5 permitting of easy access to the nut. Combined thrust and journal ball bearings may be used in place of the roller bearings.

What I claim is:

1. In a Z crank axial engine a rocker comprising a body and two-part arms, bearings to support the rocker on the crank, pivots to connect one part of each arm to the rocker body so that it may swing about an axis parallel to the axis of the rocker body, and a wrist pin to connect the other part of each arm to a slider positioned in a guide, said other part of each arm being slidable axially and rotatable in said one part of its arm.

2. In a Z crank axial engine a rocker comprising a body and two-part arms, bearings to support the rocker on the crank, one part of each arm being a sleeve and the other part of each arm being a stem slidable and rotatable in the sleeve, means for holding the sleeve of one arm rigidly to the body, pivots to connect the sleeves of the remaining arms to the body so that they may swing about an axis parallel to the axis of the body, and wrist pins to connect the outer ends of the stems to sliders positioned in guides.

3. In a Z crank axial engine comprising pistons and a rocker as set forth in claim 2 characterized in that the sliders to which the arms are attached are part of the pistons.

4. In a Z crank axial engine comprising pistons and a rocker as set forth in claim 2 characterized in that the sliders are in the form of split cylinders, guides to so hold the sliders that they are coaxial with the cylinders of the engine, and connecting rods between the sliders and the pistons.

5. In a Z crank axial engine a rocker supported on the crank by combined thrust and journal bearings, the rocker comprising a body and pivoted two-part arms, the rocker body being in two coaxial sections fitting together, bolts to rigidly connect the sections together, a flange upon each section perforated to take the bolts and the pivots of the arms, and in each section a shouldered recess for one of the combined thrust and journal bearings.

6. In a Z crank axial engine a rocker comprising a body and two-part arms, bearings to support the rocker on the crank, one part of each arm being a cylindrical sleeve and the other part of each arm being a hollow stem slidable and rotatable in the sleeve, trunnions upon the sleeves, perforations in the rocker body to take the trunnions, wrist pins to connect the stems to sliders positioned in guides, the sleeve of one arm being locked to the rocker body and the sleeves of the other arms being free to swing about the axes of the trunnions, the sleeves having their inner ends closed, each hollow stem having perforations through its walls through which oil may be drawn and ejected and having an oil duct leading to the wrist pin.

WILLIAM AUGUSTUS COOMBS.